(12) United States Patent
Komatsu et al.

(10) Patent No.: US 6,906,876 B2
(45) Date of Patent: Jun. 14, 2005

(54) MAGNETIC TRANSFER METHOD AND APPARATUS

(75) Inventors: Kazunori Komatsu, Kanagawa-ken (JP); Masakazu Nishikawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 292 days.

(21) Appl. No.: 10/147,976

(22) Filed: May 20, 2002

(65) Prior Publication Data
US 2002/0171958 A1 Nov. 21, 2002

(30) Foreign Application Priority Data

May 21, 2001 (JP) ........................................ 2001-151251
May 21, 2001 (JP) ........................................ 2001-151252
Sep. 18, 2001 (JP) ........................................ 2001-283424

(51) Int. Cl.[7] ................................................ G11B 5/86
(52) U.S. Cl. ............................ 360/17; 360/15; 360/16
(58) Field of Search ..................................... 360/15–17

(56) References Cited

U.S. PATENT DOCUMENTS 6,347,016 B1 * 2/2002 Ishida et al. .................. 360/17
6,469,848 B1 * 10/2002 Hamada et al. ............... 360/17

FOREIGN PATENT DOCUMENTS

| JP | 63-183623 | 7/1988 |
| JP | 10-40554 | 2/1998 |
| JP | 10-269566 | 10/1998 |

* cited by examiner

Primary Examiner—Sinh Tran
Assistant Examiner—Glenda P. Rodriguez
(74) Attorney, Agent, or Firm—Sughrue Mion, PLLC

(57) ABSTRACT

A favorable magnetic transfer is performed on a perpendicular magnetic recording medium. A permanent magnet apparatus provided with two permanent magnets, each having a width extending the length of the radial direction of a discoid magnetic recording medium, is used as a transfer magnetic field generating means. A conjoined body formed of the perpendicular magnetic recording medium, which has been initially magnetized unidirectionally in the direction perpendicular to the track surface thereof, and two master mediums, disposed on respective surfaces of the slave medium, is inserted between the permanent magnets. A rotating means rotates the conjoined body, in the direction along the tracks of the slave medium, while a transfer magnetic field is applied to the conjoined body in the direction substantially opposite that in which the initial magnetization of the magnetic layer of magnetic recording medium has been performed, so as to perform the magnetic transfer.

15 Claims, 4 Drawing Sheets

MAGNETIC TRANSFER METHOD AND APPARATUS

BACKGROUND OF THE INVENTION

1. Field of the Invention

The present invention relates in general to a magnetic transfer method of conjoining the magnetic layer of a magnetic transfer master medium, which has been formed in a pattern for transferring data to a magnetic recording medium, and the magnetic layer of a slave medium to form a conjoined body, and applying a transfer magnetic field to said conjoined body so as to magnetically transfer the data borne by the pattern of the magnetic layer of the master medium to the magnetic layer of the slave medium.

2. Description of the Related Art

Generally speaking, with regard to magnetic storage mediums, there is a demand for increased storage capacity and low cost. Further desired are so-called high-speed access mediums, which are capable of advantageously reading out the data of a desired location in a short time. Examples of these mediums include the high density magnetic recording mediums (magnetic disk mediums) utilized in hard disk apparatuses and floppy (R) disk apparatuses. So-called tracking servo technology, wherein the magnetic head accurately scans a narrow width track to achieve a high S/N ratio, plays a substantial role in attaining the high storage capacity thereof. A servo signal, address data signal, replay clock signal, etc., used for tracking within a certain interval occurring in one rotation of the disk are "preformatted", that is, recorded on the disk in advance.

Magnetic transfer methods realizing accurate and efficient preformatting, wherein the data such as a servo signal or the like borne on a master medium is magnetically transferred therefrom to a magnetic recording medium, have been proposed in, for example, Japanese Unexamined Patent Publication Nos. 63(1988)-183623, 10(1998)-40544, and 10(1998)-269566.

According to these magnetic transfer technologies, a master medium having an uneven pattern corresponding to the data that is to be transferred to a slave medium (a magnetic recording medium) is prepared. By bringing this master medium brought into close contact with a slave medium to form a conjoined body, and applying a transfer magnetic field thereto, a magnetic pattern corresponding to the data (e.g., a servo signal) borne on the master medium is transferred to the slave medium. The preformatting can be performed without changing the relative positions of the master medium and the slave medium—that is, while the two media remain static. Therefore not only is it possible to perform an accurate recording of the preformat data, it becomes possible to advantageously do so in an extremely short time.

However, as to the magnetic recording medium, two possibilities are longitudinal magnetic recording mediums provided with a good magnetization axis in the longitudinal direction in relation to the surface of the magnetic layer thereof, and perpendicular magnetic recording mediums provided with an easy magnetization axis in the perpendicular direction in relation to the surface of the magnetic layer thereof; however, in current practice, longitudinal magnetic recording mediums are generally employed, and the magnetic transfer technology described above has also been developed focusing mainly on the longitudinal magnetic recording mediums as the magnetic recording medium of choice. On the other hand, if a perpendicular magnetic recording medium is employed, in comparison to the longitudinal magnetic recording mediums, an increase in data storage capacity can be expected.

For cases in which a magnetic transfer is performed on a perpendicular magnetic recording medium, a magnetic field must be applied in the perpendicular direction with respect to the surface of the magnetic layer thereof; wherein the optimal conditions differ with respect to cases in which a magnetic transfer is performed on a longitudinal magnetic recording medium.

SUMMARY OF THE INVENTION

The present invention has been developed in view of the forgoing circumstances, and it is an object of the present invention to provide a magnetic transfer master medium capable of performing a favorable magnetic transfer onto a perpendicular magnetic recording medium.

The magnetic transfer method according to the present invention is a magnetic transfer method comprising the steps of: conjoining the data bearing surface, which consists of a magnetic layer formed in a pattern corresponding to the data to be transferred to the magnetic layer of a slave medium, of a master medium with the magnetic layer of said slave medium to form a conjoined body, and applying a transfer magnetic field to the respective magnetic layers of the conjoined master medium and slave medium to magnetically transfer the data to the slave medium, wherein the slave medium is a perpendicular magnetic recording medium, and after the magnetic layer of said slave medium has been subjected to an initial magnetization process consisting of applying an initial direct current magnetic field to said magnetic layer unidirectionally in the direction perpendicular to the track direction thereof to initially magnetize said magnetic layer, the magnetic layer of the slave medium and the magnetic layer of the master medium are conjoined and a transfer magnetic field is applied to the respective magnetic layers thereof in the direction opposite that in which the initial direct current magnetization has been performed.

Here, the expression "magnetically transfer the data" refers to the formation of a pattern, which corresponds to said data, on the magnetization array of the magnetic layer of the slave medium.

Further, the referents of "conjoined" include not only the state wherein the respective surfaces of both of said mediums are in complete contact with each other, but also states wherein said mediums are disposed in a state wherein a uniform interval is maintained between the respective surfaces thereof.

Still further, the initial magnetization of the slave medium can be performed while the slave medium and the master medium are in the conjoined state, or while the slave medium and the master medium are not in the conjoined state. For the case in which the initial magnetization is performed while the master medium and the slave medium are not in the conjoined state, the slave medium can be conjoined with the master medium after the initial magnetization thereof has been performed.

In addition, according to the magnetic transfer method of the present invention, the intensity of the transfer magnetic field is greater than or equal to 0.5 times and less than or equal to 3.5 times the magnetic coercive force of the slave medium.

Further, the conjoined body formed of the conjoined master medium and slave medium can be moved relative to the transfer magnetic field, which is generated over an area that is narrower than the track region, so as to pass the entirety of the track region of said slave medium through the transfer magnetic field.

In particular, for cases in which the slave medium is a discoid shape having concentric circular tracks, the aforementioned region narrower than the track region can be made to have a width spanning a single region extending in the radial direction of the track from the track of the smallest radius of the slave medium to the track of the largest radius of the slave medium; wherein the aforementioned relative movement can consist of rotating the slave medium an amount corresponding to the complete track thereof.

Here, the track region of the slave medium and the concentric circular tracks refer to the track region formed by the magnetic transfer as well as the concentric tracks.

Note that the movement relative to the transfer magnetic field may be movement of the slave medium and the master medium, or, alternatively, movement of the transfer magnetic field.

The magnetic transfer method according to the present invention is a magnetic transfer method comprising the steps of: conjoining the data bearing surface, which consists of a magnetic layer formed in a pattern corresponding to the data to be transferred to the magnetic layer of a slave medium, of a master medium with the magnetic layer of said slave medium to form a conjoined body, and applying a transfer magnetic field to the respective magnetic layers of the conjoined master medium and slave medium to magnetically transfer the data to the slave medium, and can be implemented by a magnetic transfer apparatus comprising:

an initial magnetizing means for subjected the slave medium to an initial magnetization process consisting of applying an initial direct current magnetic field to said magnetic layer unidirectionally in a direction perpendicular to the track surface thereof to initially magnetize said magnetic layer unidirectionally in the direction perpendicular to said track surface, and a transfer magnetic field applying means for applying a transfer magnetic field to the conjoined body formed of the conjoined master medium and slave medium in the direction opposite that in which the initial direct current magnetization has been performed.

According to the magnetic transfer apparatus described above, the transfer magnetic field applying means can be a means comprising: a transfer magnetic field generating means for generating a transfer magnetic field on a region of the slave medium narrower than the track region thereof, and a moving means for moving the conjoined body formed of the master medium and slave medium, which have their respective magnetic layers in close contact with each other, relative to said transfer magnetic field so as to pass the entirety of the track region of said slave medium through the transfer magnetic field.

Further, the transfer magnetic field generating means can be a means for generating a transfer magnetic field over the region extending in the radial direction from the track of the smallest radius of a discoid slave medium to the track of the largest radius of said slave medium having concentric circular tracks; wherein the moving means can be a means for rotating the discoid slave medium a complete rotation along the tracks thereof.

Still further, for cases in which the slave medium is a discoid perpendicular recording medium having concentric circular tracks, after the magnetic layer of said slave medium has been subjected to an initial magnetization process consisting of applying an initial direct current magnetic field to said magnetic layer unidirectionally in the direction perpendicular to the track direction thereof to initially magnetize said magnetic layer, a transfer magnetic field can be generated across a region narrower than the track region of the slave medium and having a width larger than that of the track of the largest radius, in the direction opposite that in which the initial direct current magnetization has been performed, to perform the magnetic transfer; wherein the conjoined body formed of the conjoined slave medium and master medium can be moved relative to the transfer magnetic field so as to pass the entirety of said track surface of the slave medium through said transfer magnetic field.

The magnetic transfer method according to the present invention is a magnetic transfer method comprising the steps of: conjoining the data bearing surface, which consists of a magnetic layer formed in a pattern corresponding to the data to be transferred to the magnetic layer of a slave medium, of a master medium with the magnetic layer of said slave medium to form a conjoined body, and applying a transfer magnetic field to the respective magnetic layers of the conjoined master medium and slave medium to magnetically transfer the data to the slave medium, and can be implemented by a magnetic transfer apparatus comprising:

an initial magnetizing means for subjecting a discoid slave medium having concentric circular tracks to an initial magnetization process consisting of applying an initial direct current magnetic field to said magnetic layer unidirectionally in the direction perpendicular to the track surface thereof to initially magnetize said magnetic layer unidirectionally in the direction perpendicular to said track surface, and a transfer magnetic field applying means for generating a transfer magnetic field across a region narrower than the track region of the slave medium and having a width larger than that of the track of the largest radius, in the direction opposite that in which the initial direct current magnetization has been performed, to perform the magnetic transfer; wherein the conjoined body formed of the conjoined slave medium and master medium can be moved relative to the transfer magnetic field so as to pass the entirety of said track surface of the slave medium through said transfer magnetic field.

Note that according to each magnetic transfer apparatus described above, the transfer magnetic field applying means may also serve as the initial magnetizing means.

Further, as to the transfer magnetic field generating means for applying the transfer magnetic field, although an electromagnetic apparatus or a permanent magnetic apparatus can be employed thereas, from the standpoint of the setting and adjustability of the intensity of the magnetic field and other such conditions, it is preferable that an electromagnetic apparatus be employed. On the other hand, when performing a magnetic transfer at a fixed magnetic field intensity, from the standpoints of cost effectiveness and the ability to compactly configure the apparatus, employing a permanent magnetic apparatus is preferable.

According to the magnetic transfer method of the present invention: after subjecting the slave medium to an initial direct current magnetization unidirectionally in the direction perpendicular to the track surface thereof, by conjoining the magnetic layer of the slave medium with the magnetic layer of a master medium to form a conjoined body, and applying a transfer magnetic field to said conjoined body in the direction opposite that in which the initial direct current magnetization has been performed so as to perform a magnetic transfer, a favorable magnetic transfer can be performed on a perpendicular magnetic recording medium.

In particular, by making the intensity of the transfer magnetic field greater than or equal to 0.5 times and less than or equal to 3.5 times the coercive force of the magnetic layer of the slave medium, the magnetic transfer can be performed more accurately.

Note that if the magnetic transfer is performed such that the conjoined body formed of the conjoined master medium and slave medium is moved relative to the transfer magnetic field, which is generated over an area that is narrower than the track region, so as to pass the entirety of the track region of said slave medium through said transfer magnetic field, the manufacture of preformatted slave mediums can be performed easily and efficiently.

In particular, if the magnetic transfer is performed by use of a method wherein the transfer magnetic field is generated over the region of a discoid slave medium, which has concentric circular tracks, extending in the radial direction from the track of the smallest radius thereof to the track of the largest radius thereof, and the conjoined body formed of the conjoined master medium and slave medium is rotated so as to perform the magnetic transfer, the magnetic transfer to a disk shaped magnetic recording medium or the like can be efficiently performed by use of a simple apparatus configuration.

Further, if the magnetic transfer is performed by use of a method wherein the transfer magnetic field is generated over the region of a discoid slave medium narrower than the track region of the said slave medium and having a width larger than that of the track of the largest radius, so as to perform the magnetic transfer; wherein the conjoined body formed of the conjoined slave medium and master medium is moved relative to the transfer magnetic field so as to pass the entirety of said track surface of the slave medium through said transfer magnetic field, because it becomes possible to perform the magnetic transfer across the entirety of the track surface by moving the conjoined body linearly, without any complicated rotational movement or the like, the magnetic transfer to a disk shaped magnetic recording medium or the like can be performed efficiently and more easily.

DESCRIPTION OF THE PREFERRED EMBODIMENTS

Figure 1:
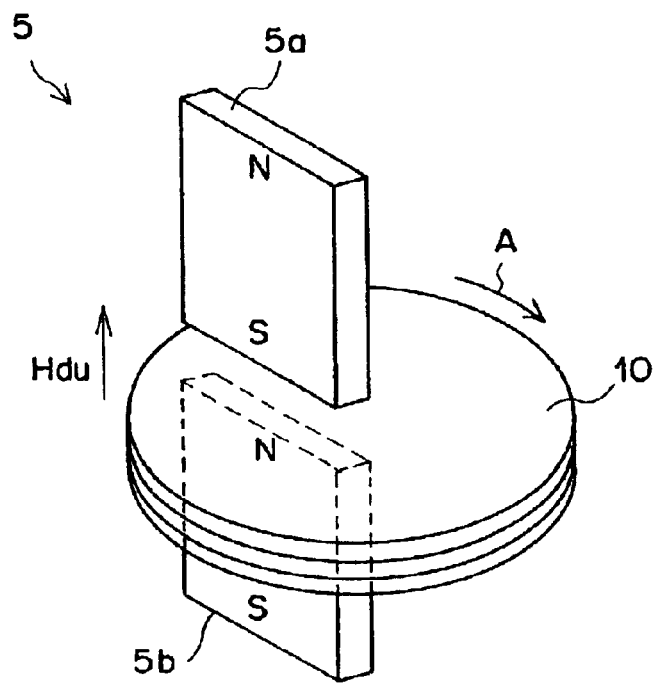
FIG. 1 is a perspective view of the main part of a transfer magnetic field applying means implementing the magnetic transfer method according to the first embodiment of the present invention.

Hereinafter the preferred embodiments of the present invention will be explained with reference to the attached drawings. FIG. 1 is a perspective view of the main part of a transfer magnetic field applying means implementing the magnetic transfer method according to the first embodiment of the present invention.

The transfer magnetic field applying means 1 shown in FIG. 1 comprises a permanent magnet apparatus 5, which is a magnetic field generating means, provided with two permanent magnets 5a and 5b, and a rotating means (not shown) for rotating a conjoined body 10, which is formed of the a discoid slave medium 2 and two discoid master mediums 3, 4 disposed on respective surfaces of the slave medium 2, in the direction indicated by the arrow A.

Figure 2:
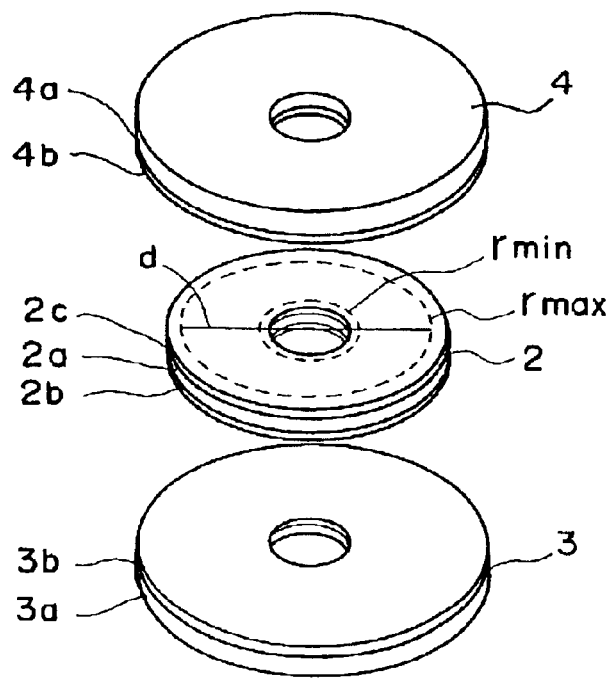
FIG. 2 is a perspective view of a master medium and a slave medium.

The permanent magnets 5a and 5b of the permanent magnet apparatus 5 are each of a width that at least spans from the smallest radius track $r_{min}$ to the largest radius track $r_{max}$ of the slave medium 2 shown in FIG. 2, and are disposed with the respective opposite magnetic pole faces thereof opposed so as to generate a magnetic field Hdu from the lower to the upper direction of the conjoined body 10. Further, because it is necessary that ample space be provided between the upper and lower permanent magnets 5a, 5b of the permanent magnet apparatus so as to facilitate the unobstructed insertion and removal of the conjoined body 10 therebetween, the permanent magnet apparatus is also provided with a separating means (not shown) for mutually separating the permanent magnets 5a and 5b. Note that the magnetic field Hdu is set so as to be from 0.5 to 3.5 times the intensity of the coercive force Hcs of the slave medium.

FIG. 2 is an exploded view of a conjoined body 10. The conjoined body 10 is formed of a slave medium 2, each respective magnetic layer 2b, 2c thereof with which the surface of the pattern of protrusion portions, which form a pattern on the respective master mediums 3a and 4a are conjoined; wherein, the radial direction of the respective surfaces of the slave medium 2 is matched with the width direction of the respective permanent magnet 5a, 5b when the slave medium 2 is set therebetween.

The slave medium utilized according to the magnetic transfer method of the present invention is a disk shaped magnetic recording medium such as a hard disk, a flexible disk, or the like, which has been provided with a magnetic recording layer on a single surface or on both surfaces thereof; in particular, a perpendicular magnetic recording medium on which an easily magnetizable direction of the magnetic recording layer has been formed in the direction perpendicular to the recording surface thereof is utilized thereas. The slave medium 2 shown in FIG. 2 is a perpendicular magnetic recording medium, which is recordable on both surfaces thereof, on which magnetic layers (magnetic recording layers) 2b, 2c, are formed on both surfaces of the substrate 2a thereof, respectively.

The master medium 3 is provided with protrusion portions formed in a pattern corresponding to the data to be recorded onto the lower recording surface 2b of the slave medium 2. The master medium 4 is of the same layered configuration as the master medium 3, and is provided with protrusion portions formed in a pattern corresponding to the data to be recorded onto the upper recording surface 2c of the slave medium 2. The master mediums 3, 4 comprise a substrate 3a, 4a, respectively, on each of which a pattern of protrusion portions has been formed, and a magnetic layer 3b, 4b, formed on the surface of said substrate.

Figure 3A:
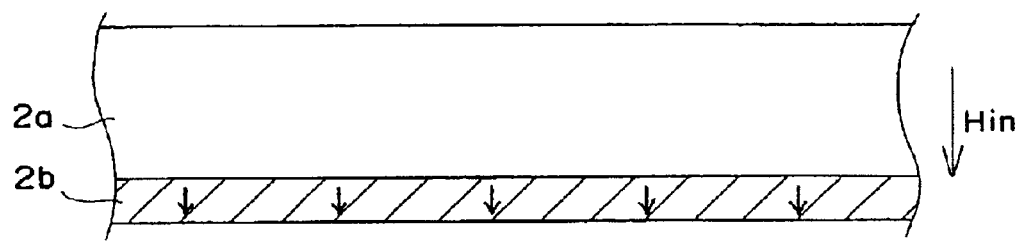
FIGS. 3A, 3B, and 3C are drawings illustrating the basic processes of a magnetic transfer method.
Figure 3B:
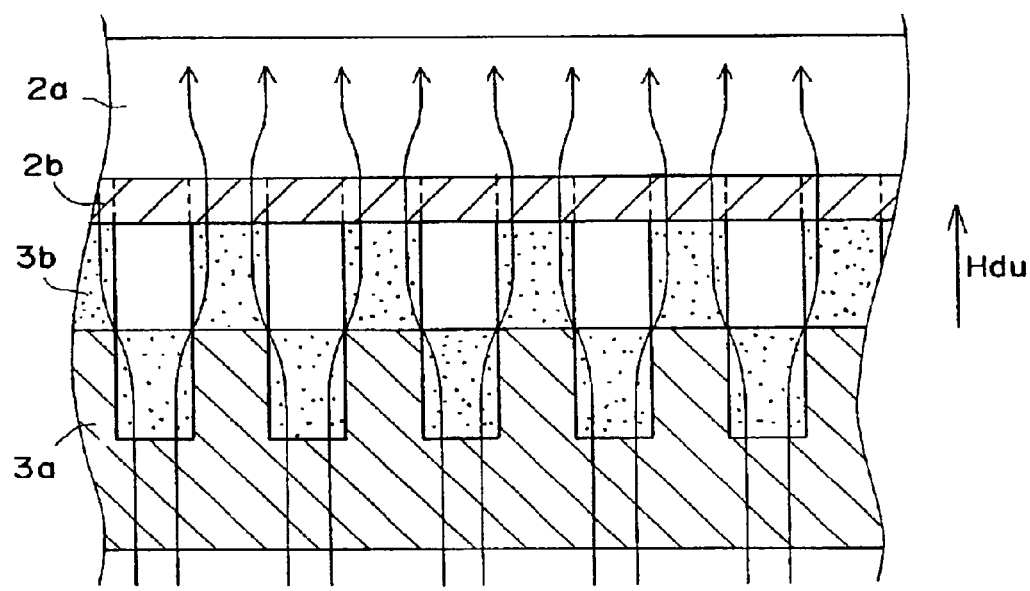
Figure 3C:
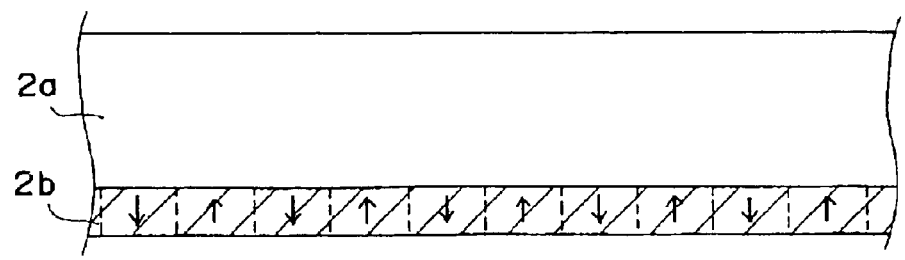

Next, the magnetic transfer method according to the present invention will be explained. First, with reference to FIGS. 3A, 3B, and 3C, the basic processes of the magnetic transfer will be explained. FIG. 3A illustrates the process wherein an initial magnetic field is applied unidirectionally to the slave medium so as to perform the initial magnetization thereof. FIG. 3B illustrates the process wherein the slave medium and the master medium are conjoined to form a conjoined body, and a transfer magnetic field is applied thereto in the direction opposite that in which the initial magnetization has been performed. FIG. 3C shows the state of the recording surface of the slave medium after the magnetic transfer has been performed. Note that, FIG. 3 illustrates the lower face recording surface 2d of the slave medium and the lower master medium 3, and an explanation has been given for only the magnetic transfer to said lower face recording surface 2b; however, a magnetic transfer to the upper face recording surface 2c can be performed in the same manner.

As shown in FIG. 3A, an initial direct current magnetic field Hin is applied in the direction perpendicular to the track surface of the of the slave medium 2 in advance, so as to initially magnetize the recording surface 2b thereof in one direction. Then, as shown in FIG. 3B, the surface of the recording layer 2b of this slave medium 2 is conjoined with the pliable magnetic layer 3b on the surface of the protrusion portions of the master medium 3 to form a conjoined body, and a transfer magnetic field Hdu is applied thereto in the perpendicular to the recording layer 2b of the slave medium 2 and in opposite direction that the initial direct current magnetic field Hin has been applied (i.e., in the direction opposite the direction in which the initial magnetization has been performed) to perform the magnetic transfer. As a result, the data (a servo signal, for example) corresponding to the pattern of protrusion portions formed on the surface of the master medium 3 is magnetically transferred and recorded on the magnetic recording surface 2b of the slave medium 2, as shown in FIG. 3C.

Note that, even for cases in which the uneven pattern of the master medium 3 is a negative pattern, the opposite to that of the positive pattern shown in FIG. 3B, by reversing the above described directions in which the initial direct current magnetic field Hin and the transfer magnetic field Hdu are applied, the same data can be magnetically transferred and recorded.

Next, the magnetic transfer method employing the transfer magnetic field applying means shown in FIG. 1 will be explained.

First, the initial magnetization of the magnetic layers 2b, 2c of the slave medium 2 is performed by use of an initial direct current magnetizing means (not shown). That is to say, an initial direct current magnetic field Hin is applied to the magnetic layers 2b, 2c in the direction perpendicular thereto, whereby the initial magnetization of the magnetic layers is performed.

Then, the pattern of protrusion portions on each of the master mediums 3, 4 is conjoined to the magnetic layers 2b, 2c, respectively of the slave medium to form a conjoined body 10. Next, the conjoined body 10 is inserted between the permanent magnets 5a, 5b of the permanent magnet apparatus 5, wherein there is ample space separating said permanent magnets 5a, 5b, so that the transfer magnetic field Hdu can be applied thereto in the direction opposite that in which the initial magnetization of the magnetic layers 2b, 2c of the slave medium has been performed. Then, the permanent magnets 5a, 5b are made to approach the respective surfaces of the conjoined body 10, and the transfer magnetic field Hdu is applied. The conjoined body 10 is rotated one full rotation in the direction indicated by the arrow A by a rotating means (not shown) while the permanent magnets are in the vicinity of the conjoined body 10.

According to the current embodiment, the magnetic layers 2b, 2c of the slave medium have been initially magnetized in advance, and then the master mediums 3, 4 have been conjoined therewith, respectively; however, the initial magnetization of the magnetic layers 2b, 2c of the slave medium 2 can be performed in the state wherein the slave medium 2 has been conjoined with the master mediums 3, 4 in advance.

Further, according to the current embodiment, the conjoined body 10 has been rotated relative to the transfer magnetic field Hdu; however, a configuration wherein the permanent magnets 5a, 5b are rotated relative to the conjoined body, which has been fixed in a stationary position, can also be employed.

According to the magnetic transfer apparatus of the present embodiment, a magnetic transfer to a perpendicular magnetic transfer medium can be performed easily, and moreover, the quality of said transfer is high. By enabling a favorable magnetic transfer to be performed to a perpendicular magnetic transfer medium, magnetic recording mediums having a larger storage capacity in comparison to convention high-density planar recording mediums can be easily obtained.

Further, the transfer magnetic field applying means can be a means comprising a transfer magnetic field generating means, and a moving means; in particular, by making the transfer magnetic field generating means a means for generating a transfer magnetic field over the region extending in the radial direction from the track of the smallest radius of a discoid slave medium to the track of the largest radius of said slave medium having concentric circular tracks, and the moving means a means for rotating the discoid slave medium relative to the transfer magnetic field a complete rotation along the track thereof, the performance of a magnetic transfer to a discoid recording medium such as a hard disc or a flexible disk can be optimized, and the magnetic transfer can be performed efficiently by an apparatus of a simple configuration.

Further, the transfer magnetic field applying means 1 can also be used as the initial direct current magnetizing means. In this case, the upper and lower surfaces of the slave medium can be set between the permanent magnets 5a, 5b so that the magnetic layers 2b, 2c thereof are reversed when the transfer magnetic field is to be applied, whereby the direction in which the transfer magnetic field Hdu is applied thereto is the opposite of that in which the initial direct current magnetic field Hin was applied.

By combining the transfer magnetic field applying means and the initial direct current magnetizing means into an integrated unit, the cost of the apparatus can be kept low, and it becomes possible to provide preformatted magnetic recording mediums at an inexpensive price.

Note that it is necessary that the value employed for the intensity of the transfer magnetic field and the initial direct current magnetic fields be determined based on consideration of the coercive force of the slave medium, the relative permeability of the master medium and the slave medium, or the like. However, as described above, the intensity of the transfer magnetic field is to be a value greater than or equal to 0.05 times and less or equal to than 3.5 times the coercive force Hcs of the slave medium.

Figure 4:
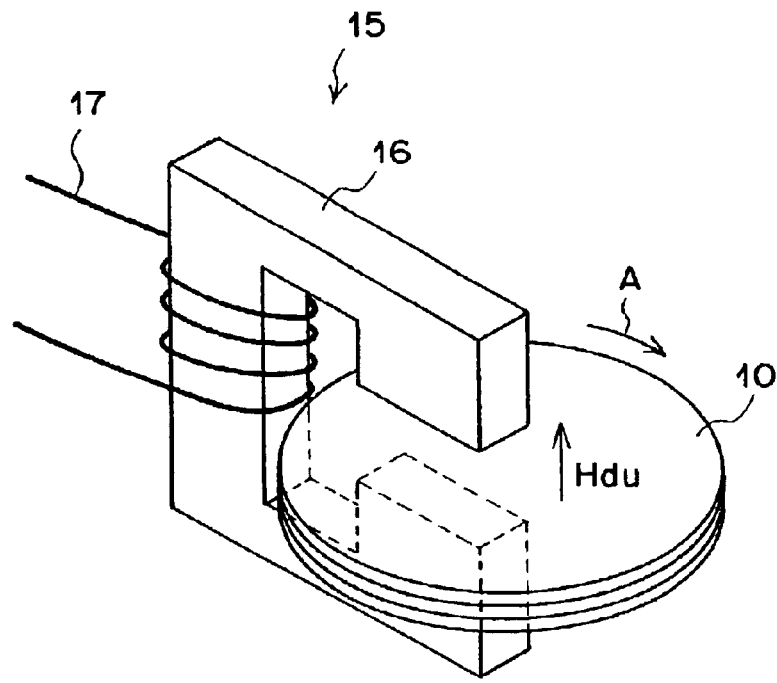
FIG. 4 is a schematic drawing of a variation on the first embodiment.

According to the above-described embodiment, although a permanent magnet apparatus 5 has been employed for explanatory purposes as the magnetic field generating means, an electromagnetic apparatus 15 such as that shown in FIG. 4 can also be employed thereas. The electromagnetic apparatus 15 shown in FIG. 4 is disposed both above an below the conjoined body 10, and comprises a core 16, which is of a width corresponding to the length in the radial direction of the conjoined body, having a predetermined gap, and around which a coil 17 has been wound. The magnetic transfer method employing this electromagnetic apparatus 15 is substantially the same as that described above. If the electromagnetic apparatus 15 is employed, it becomes possible to easily change the direction and intensity of the magnetic field.

Figure 5:
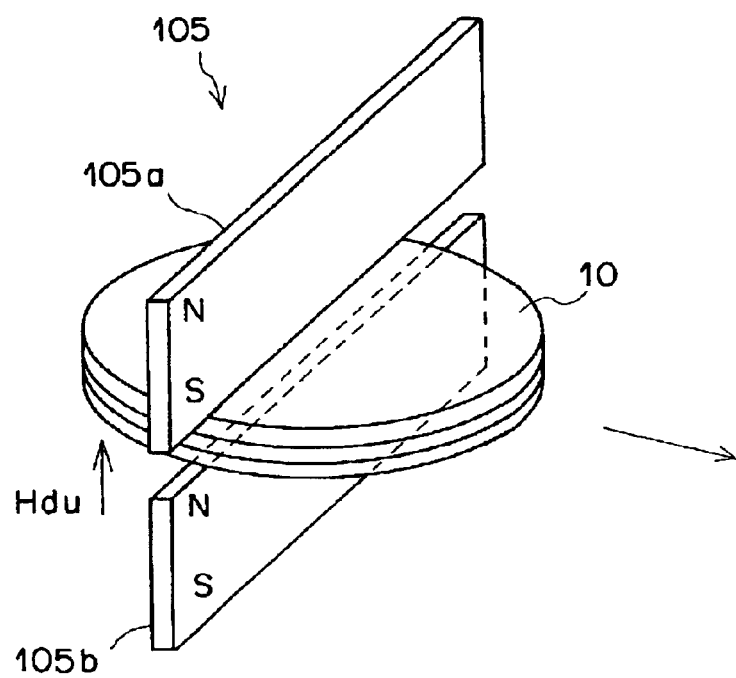
FIG. 5 is a perspective view of the main part of a transfer magnetic field applying means implementing the magnetic transfer method according to the second embodiment of the present invention.

FIG. 5 is a perspective view of the main part of a transfer magnetic field applying means implementing the magnetic transfer method according to the second embodiment of the present invention.

According to the magnetic transfer method of the second embodiment, unlike the magnetic transfer method of the first embodiment, the magnetic disk or the magnetic field generating means is not rotated the one relative to the other; however, the magnetic transfer method of the second embodiment is a method wherein it is possible to perform the magnetic transfer across the entire track surface of the slave medium by only a linear motion of the magnetic disk or the magnetic field generating means.

The transfer magnetic field applying means shown in FIG. 5 comprises a permanent magnet apparatus 105, which is a magnetic field generating means, provided with two permanent magnets 105a and 105b, and a moving means (not shown) for moving the conjoined body 10, which is formed of the a discoid slave medium 2 and two discoid master mediums 3, 4 disposed on respective surfaces of the slave medium 2, in the direction indicated by the arrow.

As shown in FIG. 2 the permanent magnets 105a and 105b of the permanent magnet apparatus 105 are each of a width equivalent to the length of the diameter d of the slave medium 2, and are disposed with the respective opposite magnetic pole faces thereof opposed so as to generate a magnetic field Hdu oriented from the lower to the upper direction of the conjoined body 10. Note that the magnetic field Hdu is set so as to be from 0.5 to 3.5 times the intensity of the coercive force Hcs of the slave medium.

First, the initial magnetization of the magnetic layers 2b, 2c of the slave medium 2 is performed by use of an initial direct current magnetizing means (not shown). That is to say, an initial direct current magnetic field Hin is applied to the magnetic layers 2b, 2c in a direction perpendicular thereto, whereby the initial magnetization of the magnetic layers is performed.

Then, the surface of the pattern of protrusion portions, which form a pattern on the surface of each of master mediums 3, 4 is conjoined to the magnetic layers 2b, 2c, respectively, of the slave medium to form a conjoined body 10. Next, the conjoined body 10 is moved in the direction indicated by the arrow and passed through the permanent magnets 105a, 105b so that the transfer magnetic field Hdu is applied to the entire surface thereof in the direction opposite that in which the initial magnetization of the magnetic layers 2b, 2c of the slave medium has been performed.

According to the current embodiment, the magnetic layers 2b, 2c of the slave medium have been initially magnetized in advance, and then the master mediums 3, 4 have been conjoined therewith, respectively; however, the initial magnetization of the magnetic layers 2b, 2c of the slave medium 2 can be performed in the state wherein the slave medium 2 has been conjoined with the master mediums 3, 4 in advance.

According to the current embodiment, the conjoined body 10 has been moved relative to the transfer magnetic field Hdu; however, a configuration wherein the permanent magnets 5a, 5b can be moved relative to the conjoined body, which has been fixed in a stationary position can also be adopted.

Further, according to the magnetic transfer apparatus of the current embodiment, because the transfer magnetic field applying means comprises a magnetic field generating means for generating a transfer magnetic field across a region smaller than the track region of the slave medium and having a width larger than that of the track of the largest radius, and in the direction opposite that in which the initial direct current magnetization has been performed, it becomes possible to perform the magnetic transfer across the entirety of the track surface of the slave medium by moving, by use of the moving means, the conjoined body formed of the conjoined slave medium and master medium through the transfer magnetic field in only a linear direction; whereby the moving means can be of a simplified configuration.

Further, the transfer magnetic field applying means 1 can also be used as the initial direct current magnetizing means. In this case, the upper and lower surfaces of the slave medium can be set between the permanent magnets 5a, 5b so that the magnetic layers 2b, 2c thereof are reversed when the transfer magnetic field is to be applied, whereby the direction in which the transfer magnetic field Hdu is applied thereto is the opposite of that in which the initial direct current magnetic field Hin was applied.

By combining the transfer magnetic field applying means and the initial direct current magnetizing means into an integrated unit, the cost of the apparatus can be kept low, and it becomes possible to provide preformatted magnetic recording mediums at an inexpensive price.

Note that it is necessary that the value employed for the intensity of the transfer magnetic field and the initial direct current magnetic fields be determined based on consideration of the coercive force of the slave medium, the relative permeability of the master medium and the slave medium, or the like. However, as described above, the intensity of the transfer magnetic field is to be a value greater than or equal to 0.05 times and less or equal to than 3.5 times the coercive force Hcs of the slave medium.

Figure 6:
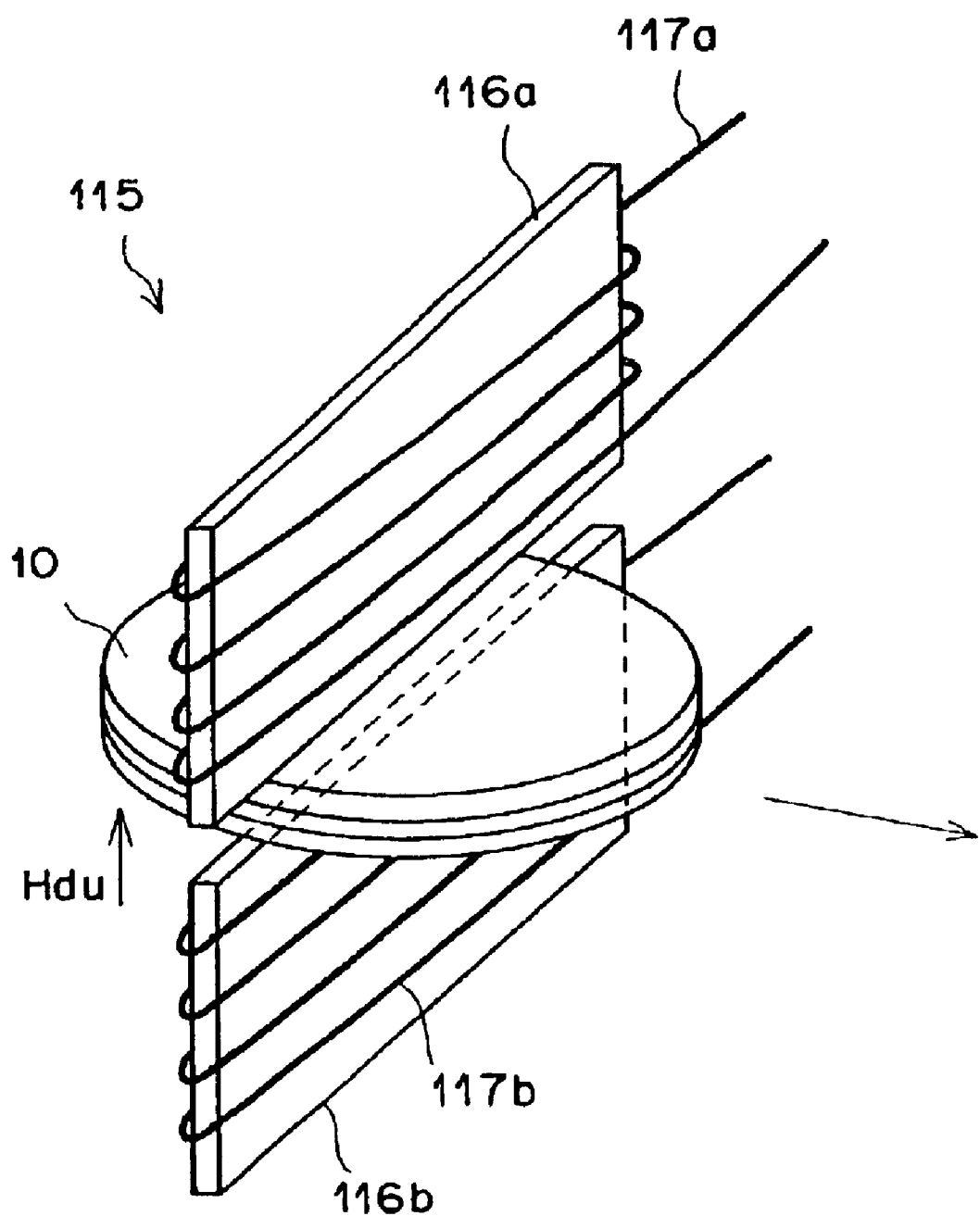
FIG. 6 is a schematic drawing of a variation on the second embodiment.

According to the second embodiment, although a permanent magnet apparatus 105 has been employed for explanatory purposes as the magnetic field generating means, an electromagnetic apparatus 115 such as that shown in FIG. 6 can also be employed thereas. The electromagnetic apparatus 115 shown in FIG. 6 is disposed both above an below the conjoined body 10, and comprises two electromagnets, each formed of a respective core 16a, 16b, which is of width larger than the length of thee radius of the largest track of the slave medium 2, around which respective coils 17a, 17b have been wound. The magnetic transfer method employing this electromagnetic apparatus 15 is substantially the same as that described above. If the electromagnetic apparatus 15 is employed, it becomes possible to easily change the direction and intensity of the magnetic field.

Next a detailed explanation of the master medium and the slave medium will be provided.

As described above, the master medium 3 comprises a substrate 3a having protrusion portions formed in a pattern on the surface thereof, and a pliable magnetic layer 3b formed on said surface (over the protrusion portions and the depression portions between the protrusion portions). A synthetic resin, a ceramic material, an alloy, aluminum, glass, quartz, silicon, nickel, or the like is used to form the substrate 3a of the master medium 3. Further, as to the material forming the pliable magnetic layer, Co, a Co alloy (CoNi, CoNiZr, CoNbTaZr, or the like), Fe, an Fe alloy (FeCo, FeCoNi, FeNiMo, FeAlSi, FeAl, FeTaN), Ni, a Ni alloy (NiFe), or the like can be employed therefor; it is particularly preferable that FeCo, or FeCoNi be employed. For cases in which the substrate 3a is a ferromagnetic body formed of Ni or the like, although it is not necessary to provide the magnetic layer 3b, the magnetic transfer can be improved if a magnetic layer 3b is provided. If the substrate 3a is formed of a non-magnetic body, it is necessary to provide the magnetic layer 3b.

The protrusion portions of the pattern on the data bearing surface of the master medium 3 can be formed by use of a stamping method, a photolithography method, or the like. Hereinafter, a simple explanation of the method of manufacturing the master medium will be explained.

First, a layer of photoresist is formed on the smooth, flat surface of a glass substrate (or a quartz substrate) by use of a spin coating process; then, a laser beam (or an electron beam), which is modulated in correspondence to a servo signal, is emitted while this glass substrate is being rotated, and a predetermined pattern, such as that of a servo signal extending linearly in the radial direction from the rotational center of each track, is exposed over the entire surface of the photoresist on the portions corresponding to each frame on the circumference. Then, the photoresist is subjected to a development process, the exposed portion of the photoresist is removed and an original disk having an uneven pattern formed by the remaining photoresist is obtained thereby. Next, the surface of the uneven pattern thus formed on the surface of the original disk is subjected to a plating process (electroforming), whereby an Ni substrate having a positive uneven pattern is formed; said Ni substrate is then peeled away from the original disk. This Ni substrate can be employed as a master medium as is, or after a pliable magnetic layer or a protective layer has been further applied over the uneven pattern thereof, as required.

Further, the aforementioned original disk can be metal plated to form a second original disk, and this second original disk used to perform a further metal plating process, whereby a substrate having a negative uneven pattern can be formed. Also, a third original disk can be formed by metal plating the second original disk or by hardening of a synthetic resin impressed onto the second original disk; this third original disk can be metal plated to obtain a substrate having a positive uneven pattern.

On the other hand, after the uneven pattern has been formed of photoresist on the glass substrate, etching can be performed to form grooves in the glass substrate, whereby a substrate from which photoresist has been removed can be obtained; a substrate can be formed therefrom based on any of the methods described above.

Ni or a Ni alloy can be used as the material to form a metallic substrate, and any of various types of methods of forming a metallic layer, including electroless deposition methods, electroformation methods, spin coating methods, and ion plating methods can be employed as the plating method used to form this substrate. It is preferable that the height of the protrusions (the depth of the uneven pattern) formed on the substrate be in the range 50–800 nm; more preferably, in the range of 80–600 nm. For cases in which this uneven pattern is that of a servo signal, said pattern is formed long in the radial direction of thereof. For example, it is preferable that the length in the radial direction be 0.05–20 $\mu$m, and 0.05–5 $\mu$m in the circumferential direction; it is preferable that a pattern of this type, in which the length in the radial direction is long and within this range, is selected as the pattern for bearing servo signal data.

The magnetic layer 3b, which is provided on the uneven pattern of the substrate, is formed of a magnetic material and by use of a vacuum layer forming means such as a vacuum deposition method, a sputtering method, an ion plating method, or by a metal plating method, etc. It is preferable that the thickness of the magnetic layer 3b be in the range of 50–500 nm; more preferably, in the range of 80–300 nm.

Note that it is preferable that a 5–30 nm Diamond Like Carbon (DLC) film or other type of protective layer be formed over the pliable magnetic layer of the surface of the protrusion portions, and that a lubricating layer also be provided. Also, it is also possible to provide a contact enhancing layer formed of Si or the like between the pliable magnetic layer and the protective layer. The lubricant serves to improve the durability with respect to surface damage due to friction or the like when correcting misalignments occurring during the conjoining process.

Note that according to the forgoing description, a master medium on which an uneven pattern has been formed on the surface thereof has been explained; however, a master medium having a flat surface formed by filling in the depression portions of the uneven pattern formed thereon with a magnetic layer can also be employed. In this case, the magnetic layer filling in the depression portions region can be a pattern formed in the same manner as a substrate having an uneven pattern.

The slave medium 2, as described above, is a disk shaped magnetic recording medium such as a hard disk, an HD flexible disk or the like; wherein the magnetic recording layer thereof is formed by coating a layer of magnetic material, or by forming a thin metallic magnetic film recording layer on the surface thereof. Note that here, a magnetic layer is provided with magnetic anisotropy and has an easy magnetization axis in the direction perpendicular to the track surface thereof. As to the material forming the thin metallic magnetic film recording layer, Co, a Co alloy (CoPtCr, CoCr, CoPtCrTa, CrNbTa, CoCeB, CoNi or the like), Fe, or an Fe alloy (FeCo, FeP, FeCoNi) can be employed therefor. Note that it is preferable that a non-magnetic sub layer be provided so as to provide the magnetic anisotropy required beneath the magnetic material (on the support body side thereof). A crystalline structure and a lattice coefficient must be matched to the non-magnetic sub layer; to this end, Cr, CrTi, CoCr, Crta, CrMo, NiAl, Ru, Pd or the like is employed. Further, it is preferable that a backing layer for stabilizing the state of the perpendicular magnetization of the magnetic layer, and improving the recording and playback sensitivity be provided under the non-magnetic sub layer.

Note that it is preferable that the thickness of the magnetic recording layer be greater than or equal to 10 nm and less than or equal to 500 nm, and more preferably, greater than or equal to 20 nm and less than or equal to 200 nm. Further, it is preferable that the thickness of the non-magnetic layer greater than or equal to 10 nm and less than or equal to 150 nm, and more preferably, greater than or equal to 20 nm and less than or equal to 80 nm. Still further, it is preferable that the thickness of the backing layer greater than or equal to 50 nm and less than or equal to 2000 nm, and more preferably, greater than or equal to 80 nm and less than or equal to 400 nm.

What is claimed is:

1. A magnetic transfer method comprising the steps of:

conjoining a magnetic layer, which has been formed in a pattern for transferring data to a magnetic layer of a slave medium, of a master medium with the magnetic layer of the slave medium to form a conjoined body, and applying a transfer magnetic field to the respective magnetic layers of the conjoined master medium and slave medium to magnetically transfer the data to the magnetic layer of the slave medium, wherein said slave medium is a perpendicular magnetic recording medium, and after the magnetic layer of said slave medium has been subjected to an initial magnetization process comprising applying an initial direct current magnetic field to said magnetic layer unidirectionally in a direction perpendicular to a track direction thereof to initially magnetize said magnetic layer, the magnetic layer of said slave medium and the magnetic layer of the master medium are conjoined and a transfer magnetic field is applied to the respective magnetic layers thereof in a direction opposite that in which the initial direct current magnetization has been performed, and said conjoined body formed of the conjoined master medium and slave medium is moved relative to the transfer magnetic field, which is generated over a region that is narrower than a track region, so as to pass the entirety of the track region of said slave medium through the transfer magnetic field.

2. A magnetic transfer method as defined in claim 1, wherein an intensity of the transfer magnetic field is greater than or equal to 0.5 times and less than or equal to 3.5 times a coercive force of the magnetic layer of the slave medium.

3. A magnetic transfer method as defined in claim 1, wherein the magnetic transfer master medium comprises a substrate provided with a surface on which an uneven pattern corresponding to the data has been formed, and a magnetic layer formed on at least a surface of protrusion portions of said substrate, whereby the magnetic layer of the master medium, which has been formed in a pattern, is constructed by the magnetic layer formed on said surface of the protrusion portions.

4. A magnetic transfer method as defined in claim 1, wherein said data represent servo signals.

5. A magnetic transfer method as defined in claim 1, wherein said slave medium is of a discoid shape having concentric circular tracks, and said region narrower than the track region has a width spanning a region extending in the radial direction from a track of the smallest radius of the slave medium to a track of the largest radius of the slave medium, wherein the relative movement comprises rotating the conjoined body formed of the conjoined slave medium and master medium relative to the transfer magnetic field along the track thereof.

6. A magnetic transfer method as defined in claim 1, wherein said slave medium is of a discoid shape having concentric circular tracks, and said region narrower than the track region has a width wider than the diameter of a track of the largest radius of the slave medium, wherein the relative movement comprises linearly moving the conjoined body formed of the conjoined slave medium and master medium.

7. A magnetic transfer apparatus for applying a transfer magnetic field to a conjoined body formed of a magnetic transfer master medium having a magnetic layer formed in a pattern for transferring data to a slave medium, and the slave medium provided with a magnetic layer, to magnetically transfer said data to the magnetic layer of the slave medium, comprising:

an initial magnetizing means for subjecting the magnetic layer of the slave medium to an initial magnetization process comprising applying an initial direct current magnetic field to said magnetic layer unidirectionally in a direction perpendicular to a track surface thereof to initially magnetize said magnetic layer unidirectionally in the direction perpendicular to said track surface, and a transfer magnetic field applying means for applying a transfer magnetic field to said conjoined body formed of the master medium and the slave medium in the direction opposite that in which the initial magnetization has been performed, wherein said transfer magnetic field applying means comprises, a transfer magnetic field generating means for generating a transfer magnetic field on a region of the slave medium narrower than the track region thereof, and a moving means for moving the conjoined body formed of the conjoined master medium and slave medium relative to said transfer magnetic field so as to pass the entirety of the track region of said slave medium through the transfer magnetic field.

8. A magnetic transfer apparatus as defined in claim 7, wherein the intensity of the transfer magnetic field is greater than or equal to 0.5 times and less than or equal to 3.5 times a coercive force of the magnetic layer of the slave medium.

9. A magnetic transfer apparatus as defined in claim 7, wherein the magnetic transfer master medium comprises, a substrate provided with a surface on which an uneven pattern corresponding to the data has been formed, and a magnetic layer formed on at least protrusion portions on the surface of said substrate, whereby said formed magnetic layer is formed by disposing the magnetic layer on the surface of said protrusion portions.

10. A magnetic transfer apparatus as defined in claim 7, wherein said data represent servo signals.

11. A magnetic transfer apparatus as defined in claim 7, wherein the transfer magnetic field applying means also serves as the initial magnetizing means.

12. A magnetic transfer apparatus as defined in claim 7, wherein said magnetic transfer field generating means is an electromagnetic apparatus.

13. A magnetic transfer apparatus as defined in claim 7, wherein said magnetic transfer field generating means is a permanent magnet apparatus.

14. A magnetic transfer apparatus as defined in claim 7, wherein, the transfer magnetic field generating means is a means for generating a transfer magnetic field over a region extending in the radial direction from a track of a smallest radius of a discoid slave medium to a track of a largest radius of said slave medium, which has concentric circular tracks, and said moving means is a means for rotating said conjoined body relative to the transfer magnetic field along said tracks.

15. A magnetic transfer apparatus as defined in claim 7, wherein, said transfer magnetic field generating means is a means for generating a transfer magnetic field across a region narrower than the track region of the slave medium and having a width larger than the diameter of the track of the largest radius thereof, and said moving means is a means for moving said conjoined body in a linear direction relative to the transfer magnetic field so as to pass the entirety of said track surface of the slave medium through said transfer magnetic field.

\* \* \* \* \*